United States Patent
Yoshizawa

(10) Patent No.: US 11,345,298 B2
(45) Date of Patent: May 31, 2022

(54) DRIVER MONITORING DEVICE AND DRIVER MONITORING METHOD

(71) Applicant: Panasonic Intellectual Property Management Co., Ltd., Osaka (JP)

(72) Inventor: Shinichi Yoshizawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/123,822

(22) Filed: Dec. 16, 2020

(65) Prior Publication Data

US 2021/0197747 A1 Jul. 1, 2021

(30) Foreign Application Priority Data

Dec. 26, 2019 (JP) .............................. JP2019-237169
Sep. 23, 2020 (JP) .............................. JP2020-158593

(51) Int. Cl.
*B60Q 1/00* (2006.01)
*B60R 21/015* (2006.01)
(Continued)

(52) U.S. Cl.
CPC ... *B60R 21/01552* (2014.10); *B60H 1/00978* (2013.01); *B60K 35/00* (2013.01);
(Continued)

(58) Field of Classification Search
CPC ... B60R 21/01552; B60R 22/46; B60R 22/48; B60R 2022/4808; B60Q 9/00; B60Q 3/70; B62D 1/04; B60K 35/00; B60K 2370/152; B60K 2370/158; B60K 2370/157; B60K 2370/12; B60K 2370/178; B60K 2370/741; B60K 2370/736; B60K 2370/149; B60K 2370/146; G06K 9/00362; G06K 9/00845; H04N 7/183; B60H 1/00978
See application file for complete search history.

(56) References Cited

U.S. PATENT DOCUMENTS 10,120,378 B2 * 11/2018 Matsushita ........... B60W 10/18
10,446,031 B2 * 10/2019 Agnew .................... G08G 1/16
(Continued)

FOREIGN PATENT DOCUMENTS

JP 2016-038793 3/2016
JP 6303907 4/2018

*Primary Examiner* — Toan N Pham
(74) *Attorney, Agent, or Firm* — Greenblum & Bernstein, P.L.C.

(57) ABSTRACT

A driver monitoring device includes a detector that detects a posture of a driver in a driver's seat of a vehicle based on an image captured by an image capturing device, a determination controller that determines whether an irregular posture can impede the vehicle from traveling safely based on a condition concerning traveling of the vehicle acquired from the vehicle and the posture of the driver detected by the detector, and one or more notifiers that provide a notification concerning the irregular posture in accordance with a result of a determination made by the determination controller. The one or more notifiers refrain from providing the notification concerning the irregular posture when the result of the determination indicates that the irregular posture does not impede the vehicle from traveling safely.

20 Claims, 3 Drawing Sheets

(51) Int. Cl.
*B60Q 9/00* (2006.01)
*B60Q 3/70* (2017.01)
*B62D 1/04* (2006.01)
*B60K 35/00* (2006.01)
*B60R 22/46* (2006.01)
*H04N 7/18* (2006.01)
*B60H 1/00* (2006.01)
*B60R 22/48* (2006.01)
*G06V 20/59* (2022.01)
*G06V 40/10* (2022.01)

(52) U.S. Cl.
CPC ............... *B60Q 3/70* (2017.02); *B60Q 9/00* (2013.01); *B60R 22/46* (2013.01); *B60R 22/48* (2013.01); *B62D 1/04* (2013.01); *G06V 20/597* (2022.01); *G06V 40/10* (2022.01); *H04N 7/183* (2013.01); *B60K 2370/12* (2019.05); *B60K 2370/152* (2019.05); *B60K 2370/157* (2019.05); *B60K 2370/158* (2019.05); *B60K 2370/178* (2019.05); *B60R 2022/4808* (2013.01)

(56) References Cited

U.S. PATENT DOCUMENTS

| | | | |
|---|---|---|---|
| 10,849,544 B2* | 12/2020 | Yamataka | A61B 5/1116 |
| 10,949,688 B2* | 3/2021 | Katsumata | G06K 9/00845 |
| 11,117,515 B2* | 9/2021 | Ishibashi | B60N 2/002 |
| 2017/0210357 A1* | 7/2017 | Nagai | B60T 7/14 |
| 2019/0357834 A1* | 11/2019 | Aarts | G08B 21/06 |

\* cited by examiner a
Correct driving posture b
Irregular posture (leaning forward to check right and left while vehicle is stopped)

c
Irregular posture (back is stretched while vehicle is in manual driving mode)

DRIVER MONITORING DEVICE AND DRIVER MONITORING METHOD

CROSS REFERENCE TO RELATED APPLICATIONS

The present application is based on and claims priority of Japanese Patent Application No. 2019-237169 filed on Dec. 26, 2019 and Japanese Patent Application No. JP2020-158593 filed on Sep. 23, 2020.

FIELD

The present disclosure relates to a driver monitoring device and a driver monitoring method.

BACKGROUND

There is disclosed a driver monitoring system that includes a detection unit, a determination unit, and a notification unit. The detection unit detects an irregular posture of a driver based on an image of a driver's seat of a vehicle captured by a camera. The determination unit determines whether the irregular posture of the driver detected by the detection unit is an irregular posture resulting from the driver's habit. The notification unit notifies the driver of the irregular posture in one manner when the irregular posture is determined to have resulted from the driver's habit by the determination unit and in another manner when the irregular posture is determined to have resulted from other than the driver's habit by the determination unit.

CITATION LIST

Patent Literature

PTL 1: Japanese Patent No. 6303907

SUMMARY

The driver monitoring system according to PTL 1 can be improved upon.

In view of this, a driver monitoring device and a driver monitoring method according to the present disclosure are capable of improving upon the above related art.

A driver monitoring device according to one aspect of the present disclosure includes: a detector that detects an irregular posture of a driver in a driver's seat of a vehicle based on an image captured by an image capturing device; and a determiner that determines whether the irregular posture impedes the vehicle from traveling safely based on a condition concerning traveling of the vehicle acquired from the vehicle and the irregular posture of the driver detected by the detector, wherein the determiner causes one or more notifiers provided in the vehicle to provide a notification concerning the irregular posture in response to determining that the irregular posture impedes the vehicle from traveling safely.

It is to be noted that some specific embodiments of the above aspect may be implemented in the form of a system, a method, an integrated circuit, a computer program, or a computer readable recording medium, such as a CD-ROM, or through any desired combination of a system, a method, an integrated circuit, a computer program, and a recording medium.

The driver monitoring device and so on according to the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
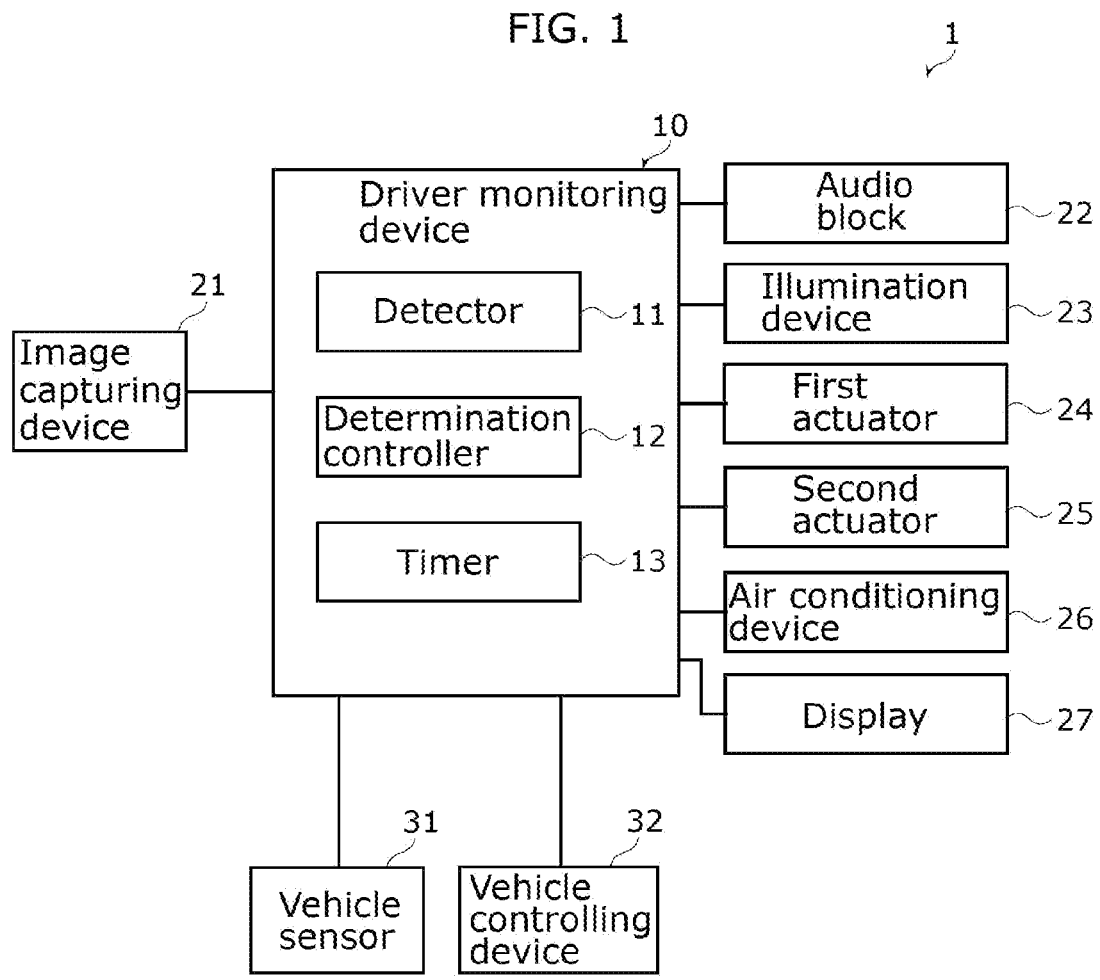
FIG. 1 is a block diagram illustrating a driver monitoring system according to an embodiment.

The existing driver monitoring device may determine that the driver is in an irregular posture even in a case where this irregular posture does not impede the vehicle from traveling, as in a case where the driver is taking a nap inside a stopped vehicle or the driver is checking the rear view while backing up the vehicle, for example. This may cause the notification unit to falsely alert the driver.

In view of the above, a driver monitoring device according to one aspect of the present disclosure includes a detector and a determiner. The detector detects an irregular posture of a driver in a driver's seat of a vehicle based on an image captured by an image capturing device. The determiner determines whether the detected irregular posture impedes the vehicle from traveling safely based on a condition concerning traveling of the vehicle acquired from the vehicle and the irregular posture of the driver detected by the detector. The determiner causes one or more notifiers provided in the vehicle to provide a notification concerning the irregular posture in response to determining the irregular posture impedes the vehicle from traveling safely.

This configuration makes it possible to extract a case where no notification concerning an irregular posture needs to be provided by determining whether the detected irregular posture can impede the vehicle from traveling safely. If the detected irregular posture can impede the vehicle from traveling safely, the driver is provided with a notification concerning the irregular posture. This is likely to impel the driver to correct his or her posture and can thus ensure the safety of the driver driving the vehicle.

Accordingly, the driver monitoring device can keep any unnecessary notification from being provided. As a result, the driver is less likely to be troubled by the notification concerning an irregular posture.

In particular, the driver monitoring device can prompt the driver to correct the posture by outputting a notification concerning the irregular posture. Therefore, the driver monitoring device can ensure the safety of the driver driving the vehicle.

A driver monitoring method according to another aspect of the present disclosure includes detecting an irregular posture of a driver in a driver's seat of a vehicle based on a captured image, determining whether the irregular posture impedes the vehicle from traveling safely based on a condition concerning traveling of the vehicle acquired from the vehicle and the detected irregular posture of the driver, and providing a notification concerning the irregular posture when it is determined that the irregular posture impedes the vehicle from traveling safely.

This driver monitoring method can also provide advantageous effects similar to those described above.

In a driver monitoring device according to another aspect of the present disclosure, the determiner determines that the irregular posture detected by the detector is an irregular posture resulting from a habit when the irregular posture detected by the detector is sustained for a predetermined time or longer starting from immediately after the driver has started driving the vehicle. Meanwhile, the determiner determines that the irregular posture detected by the detector is an irregular posture resulting from other than the habit when the irregular posture is detected continuously for a predetermined time or longer starting from a point following immediately after the driver has started driving the vehicle. The determiner causes the one or more notifiers to provide the notification concerning the irregular posture in a different mode when the irregular posture is determined to be the irregular posture resulting from the habit than when the irregular posture is determined to be the irregular posture resulting from other than the habit.

This configuration makes it possible to determine whether the detected irregular posture is resulting from the driver's habit. This determination in turn makes it possible to determine whether the irregular posture of the driver is an irregular posture resulting from the driver's habit or an irregular posture resulting from other than the driver's habit, for example. Therefore, for example, information for correcting the habit can be provided to the driver if the irregular posture is resulting from the driver's habit, or the driver can be alerted if the irregular posture is resulting from other than the driver's habit. Furthermore, the above configuration makes it possible to extract a case where no notification concerning an irregular posture needs to be provided by determining whether the detected irregular posture can impede the vehicle from traveling safely. This makes it possible to keep the driver from being notified of the irregular posture if the detected irregular posture does not impede the vehicle from traveling.

In a driver monitoring device according to another aspect of the present disclosure, the determiner determines whether the irregular posture detected by the detector impedes the vehicle from traveling safely when the irregular posture results from other than the habit. The determiner causes the one or more notifiers to refrain from providing the notification concerning the irregular posture when the irregular posture does not impede the vehicle from traveling safely.

This configuration keeps the one or more notifiers from providing a notification concerning the irregular posture if the determination result of the determiner indicates that the driver is not in an irregular posture that can impede the vehicle from traveling safely. Therefore, a notification concerning the irregular posture is not provided in a case where the detected irregular posture does not impede the vehicle from traveling. Examples of such a case include a case where the driver takes a nap upon stopping the vehicle, a case where the driver checks the rear view while backing up the vehicle, and a case where the driver operates a smartphone or the like upon pulling the vehicle over to the curb.

In a driver monitoring device according to another aspect of the present disclosure, the determiner determines that an irregular posture resulting from other than a habit that occurs within a predetermined time preceding a timing at which the vehicle makes a switch from an autonomous driving mode to a manual driving mode is an irregular posture that impedes the vehicle from traveling safely.

This configuration makes it possible to detect an irregular posture that can impede the vehicle from traveling safely.

In a driver monitoring device according to another aspect of the present disclosure, the detector detects an amount of irregularity in the irregular posture of the driver, and the determiner varies a number of the one or more notifiers that provide the notification concerning the irregular posture in accordance with the magnitude of the amount of irregularity in the irregular posture.

This configuration makes it possible to change the notification concerning the irregular posture in accordance with the condition of the driver since the amount of irregularity in the posture changes in accordance with the driving time.

In a driver monitoring device according to another aspect of the present disclosure, the determiner raises the number of the one or more notifiers that provide the notification concerning the irregular posture as the amount of irregularity in the irregular posture is greater.

This configuration makes it possible to induce the driver's alertness powerfully when it seems to take a long time to induce the alertness in the driver, for example.

In a driver monitoring device according to another aspect of the present disclosure, the determiner determines whether the posture of the driver has improved based on the amount of irregularity in the irregular posture. The determiner causes the one or more notifiers to stop providing the notification concerning the irregular posture when the determiner determines that the posture of the driver has improved.

This configuration makes it possible to keep the driver from feeling bothered by the notification after the driver has corrected his or her posture or from being distracted and failing to carefully check the vehicle's surroundings.

In a driver monitoring device according to another aspect of the present disclosure, the determiner determines whether the driver keeps his or her eyes closed for longer than a predetermined time when the amount of irregularity in the irregular posture is greater than or equal to a threshold. The determiner causes a vehicle controlling device that controls driving of the vehicle to stop the vehicle when the determiner determines that the driver has kept his or her eye closed for longer than the predetermined time.

This configuration makes it possible to reduce the chance of accident caused by the vehicle and to ensure the safety of the driver driving the vehicle.

In a driver monitoring device according to another aspect of the present disclosure, the determiner causes the one or more notifiers to provide a notification that informs a nearby vehicle of a danger when the determiner causes the vehicle controlling device to stop the vehicle.

This configuration makes it possible to alert nearby vehicles, which may then impel the drivers of the nearby vehicles to avoid collision. Therefore, the above configuration makes it possible to ensure the safety of not only the host vehicle but also the nearby vehicles.

In a driver monitoring device according to another aspect of the present disclosure, the determiner causes the one or more notifiers to provide a notification that informs a passenger in the vehicle of a danger when the determiner causes the vehicle controlling device to stop the vehicle.

This configuration makes it possible to notify other passengers of any problem with the driver and the driving condition of the vehicle when the vehicle is to be stopped. This may impel the other passengers to secure their safety.

In a driver monitoring device according to another aspect of the present disclosure, at least one notifier of the one or more notifiers is a first actuator that tightens a seat belt provided in the driver's seat, and the notification concerning the irregular posture is implemented by the first actuator tightening the seat belt provided in the driver's seat when it is determined that the irregular posture impedes the vehicle from traveling safely.

This configuration allows the driver to realize that he or she has taken the eyes off the road upon having the seat belt tightened by the first actuator when the driver has taken the eyes off the road. This may impel the driver to bring his or her eyes back to the road. Therefore, the driver monitoring device can ensure the safety of the driver driving the vehicle.

Meanwhile, the seat belt is not tightened when the detected irregular posture does not impede the vehicle from traveling safely. This allows the driver to remain in the posture for checking the rear view when the driver checks the rear view while backing up the vehicle. Moreover, the driver can remain in a relaxed posture when the driver is in a relaxed posture during automatic driving.

In a driver monitoring device according to another aspect of the present disclosure, at least one notifier of the one or more notifiers is an audio block disposed to the front of the driver's seat, and the notification concerning the irregular posture is implemented by the audio block outputting a warning sound when it is determined that the irregular posture impedes the vehicle from traveling safely.

With this configuration, when the audio block emits a warning sound from the front of the driver, the driver faces the traveling direction of the vehicle from which the sound has come. Therefore, the driver monitoring device allows the driver to realize that he or she has taken the eyes off the road. This may impel the driver to bring his or her eyes back to the road. Therefore, the driver monitoring device can ensure the safety of the driver driving the vehicle.

Meanwhile, no warning sound is output when the detected irregular posture does not impede the vehicle from traveling safely. This makes it possible to keep the driver from being distracted by the warning sound concerning the irregular posture and from failing to carefully check the vehicle's surroundings when the driver backs up the vehicle, for example.

In a driver monitoring device according to another aspect of the present disclosure, the audio block gradually raises the volume of the warning sound output from the audio block.

This configuration makes it possible to induce the alertness in the driver by raising the volume of the warning sound, for example. This leads the driver to correct his or her posture and drive carefully.

Meanwhile, no warning sound is output when the detected irregular posture does not impede the vehicle from traveling safely. This configuration can keep the driver from being disturbed when the driver is taking a nap in a stopped vehicle, for example, In a driver monitoring device according to another aspect of the present disclosure, at least one notifier of the one or more notifiers is an illumination device that illuminates the interior of a vehicle compartment, and the notification concerning the irregular posture is implemented by changing the light emitted from the illumination device when it is determined that the irregular posture impedes the vehicle from traveling safely.

This allows the driver to realize that he or she is in a bad posture by changing the light inside the vehicle compartment. Therefore, the level of alertness of the driver can be increased, and this leads the driver to correct his or her posture and drive carefully, for example.

Meanwhile, the light inside the vehicle compartment is not changed when the irregular posture does not impede the vehicle from traveling safely. This configuration can keep the driver from being disturbed when the driver is taking a nap in a stopped vehicle, for example, In a driver monitoring device according to another aspect of the present disclosure, the notification concerning the irregular posture is implemented by increasing the red tone of the light emitted from the illumination device when it is determined that the irregular posture impedes the vehicle from traveling safely.

This configuration causes the driver to feel a sense of crisis when the interior of the vehicle compartment is made red. This leads the driver to correct his or her posture and drive carefully.

In a driver monitoring device according to another aspect of the present disclosure, the notification concerning the irregular posture is implemented by increasing the brightness of the light emitted from the illumination device when it is determined that the irregular posture impedes the vehicle from traveling safely.

This configuration makes it possible to increase the level of alertness of the driver by increasing the brightness inside the vehicle compartment, for example. This leads the driver to correct his or her posture and drive carefully.

In a driver monitoring device according to another aspect of the present disclosure, at least one notifier of the one or more notifiers is an air conditioning device that conditions an air inside a vehicle compartment, and the notification concerning the irregular posture is implemented by at least one of causing the air conditioning device to lower a temperature inside the vehicle compartment or causing the air conditioning device to blow an air toward the driver when it is determined that the irregular posture impedes the vehicle from traveling safely.

This configuration makes it possible to increase the level of alertness of the driver, for example, by lowering the temperature inside the vehicle compartment or by blowing the air toward the driver. This leads the driver to correct his or her posture and drive carefully.

In a driver monitoring device according to another aspect of the present disclosure, at least one notifier of the one or more notifiers is a second actuator that causes a steering wheel in the driver's seat to vibrate, and the notification concerning the irregular posture is implemented by the second actuator causing the steering wheel in the driver's seat to vibrate when it is determined that the irregular posture impedes the vehicle from traveling safely.

This configuration allows the driver to realize that he or she has taken the eyes off the road as the steering wheel vibrates. Therefore, the level of alertness of the driver can be increased, for example. Moreover, the above configuration allows the driver to realize that he or she has taken the eyes off the road, for example. As a result, this leads the driver to correct his or her posture and drive carefully.

In a driver monitoring device according to another aspect of the present disclosure, at least one notifier of the one or more notifiers is a display capable of presenting information to the driver, and the notification concerning the irregular posture is implemented by displaying a content indicating that the irregular posture impedes the vehicle from traveling safely when it is determined that the irregular posture impedes the vehicle from traveling safely.

This configuration makes it possible to alert the driver, for example, by displaying the content indicating that the driver is in an irregular posture on the display. This leads the driver to correct his or her posture and drive carefully.

The embodiment described below merely illustrates some specific examples of the present disclosure. The numerical values, the shapes, the materials, the constituent elements, the arrangement positions of the constituent elements, and so on illustrated in the following embodiment are examples and are not intended to limit the present disclosure. Among the constituent elements described in the following embodiment, any constituent element that is not described in the independent claims is to be construed as an optional constituent element. In addition, the contents of the embodiment can be combined with each other.

Hereinafter, a driver monitoring device and a driver monitoring method according to one aspect of the present disclosure will be described in concrete terms with reference to the drawings.

Embodiment

<Configuration: Driver Monitoring System 1>

FIG. 1 is a block diagram illustrating driver monitoring system 1 according to an embodiment.

Driver monitoring system 1 according to the present embodiment includes driver monitoring device 10, image capturing device 21, vehicle sensor 31, vehicle controlling device 32, audio block 22, illumination device 23, first actuator 24, second actuator 25, air conditioning device 26, and display 27.

Driver monitoring system 1 determines whether a driver is in a dangerous condition based on a condition concerning traveling of a vehicle. The driver may be in a dangerous condition when the driver has taken his or her eyes off the road while driving or when the driver has fallen asleep behind the wheel, for example. When the driver is in a dangerous condition, driver monitoring system 1, for example, warns the driver.

Driver monitoring device 10 acquires vehicle information from vehicle sensor 31 in order to recognize the condition concerning traveling of the vehicle. Vehicle sensor 31 is communicably connected to driver monitoring device 10.

Vehicle sensor 31 generates the vehicle information by sensing the condition surrounding the vehicle and the condition of the vehicle. Vehicle sensor 31 outputs the generated vehicle information to driver monitoring device 10. The vehicle information is information that indicates the condition concerning traveling of the vehicle. The condition concerning traveling of the vehicle includes, for example but not limited to, the traveling speed of the vehicle, the position of the shift lever, the steering angle, stopping of the vehicle, an automatic driving state, and a manual driving state. The position of the shift lever includes the drive position held when the vehicle travels normally, the position for an idling state, the position for a parked state, and the position for a reverse movement of the vehicle.

Driver monitoring device 10 is communicably connected to vehicle controlling device 32 that controls traveling of the vehicle.

Vehicle controlling device 32 is connected to an in-vehicle network. Vehicle controlling device 32 converts the driver's operation on the accelerator, the brake, the steering, and so on into an electrical control signal and outputs this electrical control signal to a motive power controller, a steering controller, a brake controller, and so on via the in-vehicle network. The motive power controller, the steering controller, the brake controller, and so on control traveling, stopping, and so on of the vehicle by controlling the corresponding actuator based on the received control signal.

<Image Capturing Device 21>

Image capturing device 21 captures an image of the driver in the driver's seat of the vehicle. For example, image capturing device 21 is a charge coupled device (CCD) camera and is highly sensitive in a near-infrared range. Image capturing device 21 captures an image of the general area around the headrest in the driver's seat. Image capturing device 21 outputs a captured image that includes the driver to driver monitoring device 10.

<Driver Monitoring Device 10>

Driver monitoring device 10 monitors the condition of the driver and alerts the driver accordingly. For example, driver monitoring device 10 is constituted by an electronic control unit (ECU) that includes a processor (a microprocessor), a digital circuit such as a memory, an analog circuit, and a communication circuit. Driver monitoring device 10 is communicably connected to image capturing device 21, audio block 22, illumination device 23, first actuator 24, second actuator 25, air conditioning device 26, display 27, vehicle sensor 31, and vehicle controlling device 32. Furthermore, driver monitoring device 10 according to the present embodiment can control audio block 22, illumination device 23, first actuator 24, second actuator 25, air conditioning device 26, and display 27, which are examples of one or more notifiers that provide a notification concerning an irregular posture.

Driver monitoring device 10 includes detector 11, determination controller 12, and timer 13.

Detector 11 detects an irregular posture of the driver in the driver's seat of the vehicle based on an image captured by image capturing device 21. An irregular posture is a posture that has resulted from the driver moving his or her body to distort the posture from a proper posture that the driver is in while sitting in the driver's seat, and an irregular posture is an improper posture. Examples of an irregular posture also include a posture held when the driver is distracted with his or her eyes off the road. Specifically, detector 11 recognizes an image captured by image capturing device 21 and calculates the amount of irregularity in the posture of the driver. The amount of irregularity in the posture is defined by the amount or the degree of the distortion in the posture. When the amount of irregularity in the posture is greater than or equal to a threshold, detector 11 determines that the driver is in an irregular posture. If detector 11 has detected an irregular posture of the driver based on the amount of irregularity in the posture, detector 11 acquires time information indicating the time when the irregular posture has been detected from timer 13 and outputs the acquired time information along with information indicating the detected irregular posture to determination controller 12. The information indicating the irregular posture also includes the amount of irregularity in the posture.

For example, with the center of the headrest in the driver's seat serving as a reference point, detector 11 may calculate the amount of irregularity in the posture based on the distance between the reference point and the center of the face of the driver. Alternatively, the positions of the driver's body parts held when the driver is sitting in a proper posture in the driver's seat may be registered as respective reference points, and detector 11 may calculate the amount of irregularity in the posture based on the amount of deviation (the distance) recognized between the reference points and the body parts in an image.

Herein, detector 11 may determine how far the position of the head of the driver is away from a predefined position, and if this distance is continuously greater than or equal to a predefined distance for a predetermined time or longer, detector 11 may determine that the driver is in an irregular posture. The predefined position may be the center of the headrest in the driver's seat. In this case, detector 11 may calculate the amount of irregularity in the posture based on the distance between the predefined position and the center of the face of the driver.

Alternatively, the predefined position may be a position where the effect of a properly deployed airbag can be observed. In this case, if the head of the driver is outside the deployment area of the airbag, the airbag cannot achieve the proper effect upon collision. If the distance between the head of the driver and the airbag is too small, the driver receives a powerful impact on the head when the airbag is deployed, and thus the airbag cannot achieve the proper effect upon collision. Therefore, the predefined position may be set in accordance with the position and the size of the airbag.

The positions of the driver's body parts held when the driver is sitting in a proper posture in the driver's seat may be registered as respective reference points, and detector 11 may calculate the amount of irregularity in the posture based on the amount of deviation (the distance) recognized between the reference points and the body parts in an image.

In another example, detector 11 may detect an irregular posture based on the distribution of the pressure acting on the seating surface of the driver's seat measured with the use of a seat pressure sensor provided in the driver's seat.

Determination controller 12 determines whether the driver is in an irregular posture that can impede the vehicle from traveling safely based on the condition concerning traveling of the vehicle acquired from the vehicle and the irregular posture of the driver detected by detector 11. Determination controller 12 is an example of a determiner that determines whether a driver is in an irregular posture that can impede a vehicle from traveling safely.

An irregular posture can be an irregular posture resulting from the driver's habit or an irregular posture resulting from other than the driver's habit. When the driver is in an irregular posture resulting from the driver's habit, the amount of irregularity in the posture tends to exceed the threshold continuously starting from immediately after the driver has started driving. Examples of such a case include a case where the driver moves the driver's seat forward and drives in a slightly forward leaning posture and a case where the driver moves the driver's seat backward and drives in a slightly backward leaning posture.

An irregular posture resulting from other than the driver's habit can be an irregular posture resulting from fatigue, being distracted, or the like, an irregular posture associated with driving, and an irregular posture resulting from some other causes.

An irregular posture resulting from fatigue or the like occurs when fatigue accumulates as the driver sits for an extended period of time, for example. The amount of irregularity in the irregular posture resulting from fatigue, being distracted, and so on tends to be small immediately after the driver has started driving. Yet, this amount of irregularity tends to increase with an increase in the driving time and exceed the threshold continuously once the amount hits the threshold.

An irregular posture associated with driving is a transient irregular posture. For example, the driver may have an irregular posture associated with driving when the driver checks the rear view while backing up the vehicle, when the driver checks right and left at an intersection, or when the driver checks right and left upon stopping the vehicle before entering a road from a parking lot. The amount of irregularity in the irregular posture associated with driving tends to exceed the threshold transiently but return to the original amount of irregularity in the posture.

An irregular posture resulting from some other causes may occur when the driver stops the vehicle and takes a nap therein with the engine or the accessory position (ACC) on, when the driver pulls the vehicle over to the curb and operates a smartphone or the like, or when the driver enters a relaxed posture during automatic driving. The amount of irregularity in the irregular posture resulting from some other causes tends to exceed the threshold for an extended period of time.

If the irregular posture detected by detector 11 is sustained for a predetermined time or longer, determination controller 12 determines whether the detected irregular posture can impede the vehicle from traveling safely. If determination controller 12 has determined that the detected irregular posture can impede the vehicle from traveling safely, determination controller 12 causes the one or more notifiers provided in the vehicle to provide a notification concerning the irregular posture. Specifically, determination controller 12 determines that the driver is in an irregular posture if the amount of irregularity in the posture exceeds the threshold continuously for a predetermined time or longer. Moreover, determination controller 12 determines that the detected irregular posture results from the driver's habit if the amount of irregularity in the posture exceeds the threshold continuously for a predetermined time or longer starting from immediately after the driver has started driving. Meanwhile, determination controller 12 determines that the irregular posture detected by detector 11 is an irregular posture resulting from other than the driver's habit if detector 11 detects the irregular posture continuously for a predetermined time or longer starting from some point following immediately after the driver has started driving the vehicle. Determination controller 12 causes the one or more notifiers to provide a notification concerning the irregular posture in accordance with the determination results described above. For example, in the case of an irregular posture resulting from the driver's habit, determination controller 12 may cause one notifier (e.g., audio block 22 or display 27) to provide a notification. Meanwhile, in the case of an irregular posture that results from other than the driver's habit and that can impede the safety, determination controller 12 may cause a plurality of notifiers (e.g., audio block 22 and display 27) to provide notifications. In other words, a notification concerning an irregular posture involves displaying the content indicating that the irregular posture can impede the vehicle from traveling safely. In this manner, determination controller 12 employs different modes in which one or more notifiers provide a notification concerning an irregular posture when a detected irregular posture is determined to be an irregular posture resulting from the driver's habit than when a detected irregular posture is determined to be an irregular posture resulting from other than the driver's habit, under the control of determination controller 12.

An irregular posture that can impede the vehicle from traveling safely is an irregular posture that results from other than the driver's habit, that is, that results from, for example but not limited to, the driver taking his or her eyes off the road, a decrease in the alertness level, fatigue, or being distracted while at least the manually driven vehicle is traveling straight ahead (forward) at a speed of 10 km per hour or higher. In addition, an irregular posture that can impede the vehicle from traveling safely is an irregular posture that results from other than the driver's habit and that is present while the vehicle is in automatic driving within a predetermined time preceding the point at which the driving mode switches from an autonomous driving mode to a manual driving mode.

Meanwhile, an irregular posture that does not impede the vehicle from traveling safely may be an irregular posture that occurs when the driver checks the rear view while backing up the vehicle, when the driver checks right and left at an intersection upon stopping the vehicle, when the driver checks right and left upon stopping the vehicle before entering a road from a parking lot, when the driver stops the vehicle and takes a nap therein, when the driver pulls the vehicle over to the curb and operates a smartphone or the like, when the driver enters a relaxed posture during automatic driving, for example.

If determination controller 12 has determined that a detected irregular posture has resulted from the driver's habit but does not impede the vehicle from traveling safely, determination controller 12 refrains from causing the one or more notifiers to provide a notification concerning the irregular posture. Determination controller 12 also refrains from providing a notification concerning the irregular posture if the irregular posture detected by detector 11 is sustained for less than a predetermined time.

Herein, determination controller 12 may vary the number of notifiers to control in accordance with the magnitude of the amount of irregularity in the posture. In other words, determination controller 12 may vary the number of notifications in accordance with the magnitude of the amount of irregularity in the posture. Determination controller 12 may control more notifiers as the amount of irregularity in the posture is greater.

Timer 13 measures the duration of the irregular posture of the driver in accordance with the detection of the irregular posture by detector 11. Timer 13 outputs time information indicating the measured duration of the irregular posture to determination controller 12 via detector 11.

<Audio Block 22>

Audio block 22 is an on-board loudspeaker that outputs a warning sound. Audio block 22 outputs a warning sound toward the driver so that the driver will face the direction that the warning sound comes from. In other words, audio block 22 is disposed to the front of the driver's seat. Audio block 22 is at least one notifier of the one or more notifiers.

Audio block 22 provides a notification concerning an irregular posture in accordance with the result of a determination made by determination controller 12 as to whether a detected irregular posture can impede the vehicle from traveling safely. If the detected irregular posture can impede the vehicle from traveling safely, audio block 22 outputs a warning sound under the control responsive to an instruction of driver monitoring device 10. A notification concerning an irregular posture is implemented by audio block 22 outputting a warning sound when determination controller 12 has determined that a detected irregular posture can impede the vehicle from traveling safely.

In this case, audio block 22 raises the volume of the warning sound gradually, for example. For example, audio block 22 raises the volume of the warning sound gradually under the control responsive to an instruction of driver monitoring device 10.

Meanwhile, audio block 22 refrains from providing a notification concerning an irregular posture if determination controller 12 has determined that a detected irregular posture does not impede the vehicle from traveling safely. In this case, audio block 22 refrains from outputting a warning sound that serves as a notification.

<Illumination Device 23>

Illumination device 23 is on-board illumination device 23 that can illuminate the interior of the vehicle compartment. For example, illumination device 23 may be disposed inside the vehicle compartment in a manner that allows illumination device 23 to illuminate the entire vehicle compartment. Alternatively, illumination device 23 may be disposed outside the vehicle compartment, like a headlamp or the like. Here, illumination device 23 may be disposed in a manner that allows illumination device 23 to emit light toward the driver sitting in the driver's seat. Illumination device 23 is at least one notifier of the one or more notifiers.

Illumination device 23 provides a notification concerning an irregular posture in accordance with the result of a determination made by determination controller 12 as to whether a detected irregular posture can impede the vehicle from traveling safely. If the detected irregular posture can impede the vehicle from traveling safely, illumination device 23 changes the light emitted from illumination device 23 under the control responsive to an instruction of driver monitoring device 10. A notification concerning an irregular posture is implemented by illumination device 23 changing the light emitted from illumination device 23 when determination controller 12 has determined that a detected irregular posture can impede the vehicle from traveling safely. The change in the light emitted from illumination device 23 can be a change in the color tone of the light emitted from illumination device 23 or a change in the brightness of the light emitted from illumination device 23. In the present embodiment, the color tone of the light emitted from illumination device 23 is made red. In addition, in the present embodiment, the brightness of the light emitted from illumination device 23 is increased.

Illumination device 23 refrains from providing a notification concerning an irregular posture if determination controller 12 has determined that a detected irregular posture does not impede the vehicle from traveling safely. In this case, illumination device 23 refrains from changing the light that serves as a notification.

<First Actuator 24>

First actuator 24 is an actuator that can tighten the seat belt provided in the driver's seat. First actuator 24 is at least one notifier of the one or more notifiers.

First actuator 24 provides a notification concerning an irregular posture in accordance with the result of a determination made by determination controller 12 as to whether a detected irregular posture can impede the vehicle from traveling safely. If the detected irregular posture can impede the vehicle from traveling safely, first actuator 24 is driven to tighten the seat belt provided in the driver's seat under the control responsive to an instruction of driver monitoring device 10. A notification concerning an irregular posture is implemented by first actuator 24 tightening the seat belt provided in the driver's seat when determination controller 12 has determined that a detected irregular posture can impede the vehicle from traveling safely. First actuator 24 makes the driver realize that he or she has taken the eyes off the road by tightening the seat belt worn by the driver in the driver's seat.

First actuator 24 refrains from providing a notification concerning an irregular posture if determination controller 12 has determined that a detected irregular posture does not impede the vehicle from traveling safely. In this case, first actuator 24 refrains from actuating the seat belt.

<Second Actuator 25>

Second actuator 25 is an actuator that can cause the steering wheel in the driver's seat to vibrate. Second actuator 25 is at least one notifier of the one or more notifiers.

Second actuator 25 provides a notification concerning an irregular posture in accordance with the result of a determination made by determination controller 12 as to whether a detected irregular posture can impede the vehicle from traveling safely. If the detected irregular posture can impede the vehicle from traveling safely, second actuator 25 is driven to cause the steering wheel in the driver's seat to vibrate under the control responsive to an instruction of driver monitoring device 10. A notification concerning an irregular posture is implemented by second actuator 25 causing the steering wheel in the driver's seat to vibrate when determination controller 12 has determined that a detected irregular posture can impede the vehicle from traveling safely. Second actuator 25 makes the driver realize that he or she has taken the eyes off the road by causing the steering wheel to vibrate while the vehicle is in a manual driving mode.

Second actuator 25 refrains from providing a notification concerning an irregular posture if determination controller 12 has determined that a detected irregular posture does not impede the vehicle from traveling safely. In this case, second actuator 25 refrains from causing the steering wheel to vibrate.

<Air Conditioning Device 26>

Air conditioning device 26 is an air conditioner that conditions the air inside the vehicle compartment. Air conditioning device 26 is at least one notifier of the one or more notifiers.

Air conditioning device 26 provides a notification concerning an irregular posture in accordance with the result of a determination made by determination controller 12 as to whether a detected irregular posture can impede the vehicle from traveling safely. A notification concerning an irregular posture is implemented by air conditioning device 26 lowering the temperature inside the vehicle compartment or blows the air toward the driver when determination controller 12 has determined that a detected irregular posture can impede the vehicle from traveling safely. Air conditioning device 26 induces alertness in the driver by lowering the temperature inside the vehicle compartment or by blowing the air toward the driver.

Air conditioning device 26 refrains from providing a notification concerning an irregular posture if determination controller 12 has determined that a detected irregular posture does not impede the vehicle from traveling safely. In this case, air conditioning device 26 refrains from lowering the temperature inside the vehicle compartment or blowing the air toward the driver.

<Display 27>

Display 27 is a display in an on-board information terminal, such as a car navigation system, or an on-board display provided in the instrument panel. Display 27 may be a touch screen display provided with a liquid crystal panel, an organic electroluminescence (EL) panel, or the like. Display 27 is at least one notifier of the one or more notifiers.

Display 27 provides a notification concerning an irregular posture in accordance with the result of a determination made by determination controller 12 as to whether a detected irregular posture can impede the vehicle from traveling safely. A notification concerning an irregular posture is implemented by display 27 calling for the driver's attention by displaying the content indicating that the driver is in an irregular posture when determination controller 12 has determined that a detected irregular posture can impede the vehicle from traveling safely. Examples of the content indicating that the driver is in an irregular posture include "warning", "watch ahead", "stay away from falling asleep", and "your improper posture may impede the vehicle from traveling safely". In addition, display 27 may display a proper driving posture in order to correct the driver's irregular posture.

Meanwhile, display 27 refrains from providing a notification concerning an irregular posture if determination controller 12 has determined that a detected irregular posture does not impede the vehicle from traveling safely. In this case, display 27 refrains from displaying the content calling for the driver's attention or the proper driving posture that serves as a notification.

Display 27 also displays the content calling for the driver's attention or the proper driving posture under the control responsive to an instruction of driver monitoring device 10 if determination controller 12 has determined that a detected irregular posture results from the driver's habit. In the case of an irregular posture resulting from the driver's habit, this irregular posture does not immediately impede the vehicle from traveling safely. Therefore, display 27 may display the content calling for the driver's attention or the proper driving posture while the vehicle is stopped. This allows the driver to focus on driving.

Display 27 presents posture information if the driver is in an irregular posture resulting from the driver's habit. The posture information is information that prompts the driver to correct his or her posture and includes at least one of the proper driving posture or an influence of the irregular posture.

<Operation>

An operation of driver monitoring device 10 configured as described above and a driver monitoring method will be described.

First, with reference to FIG. 2, processing procedures performed by driver monitoring device 10 to provide a notification concerning an irregular posture will be described.

Figure 2:
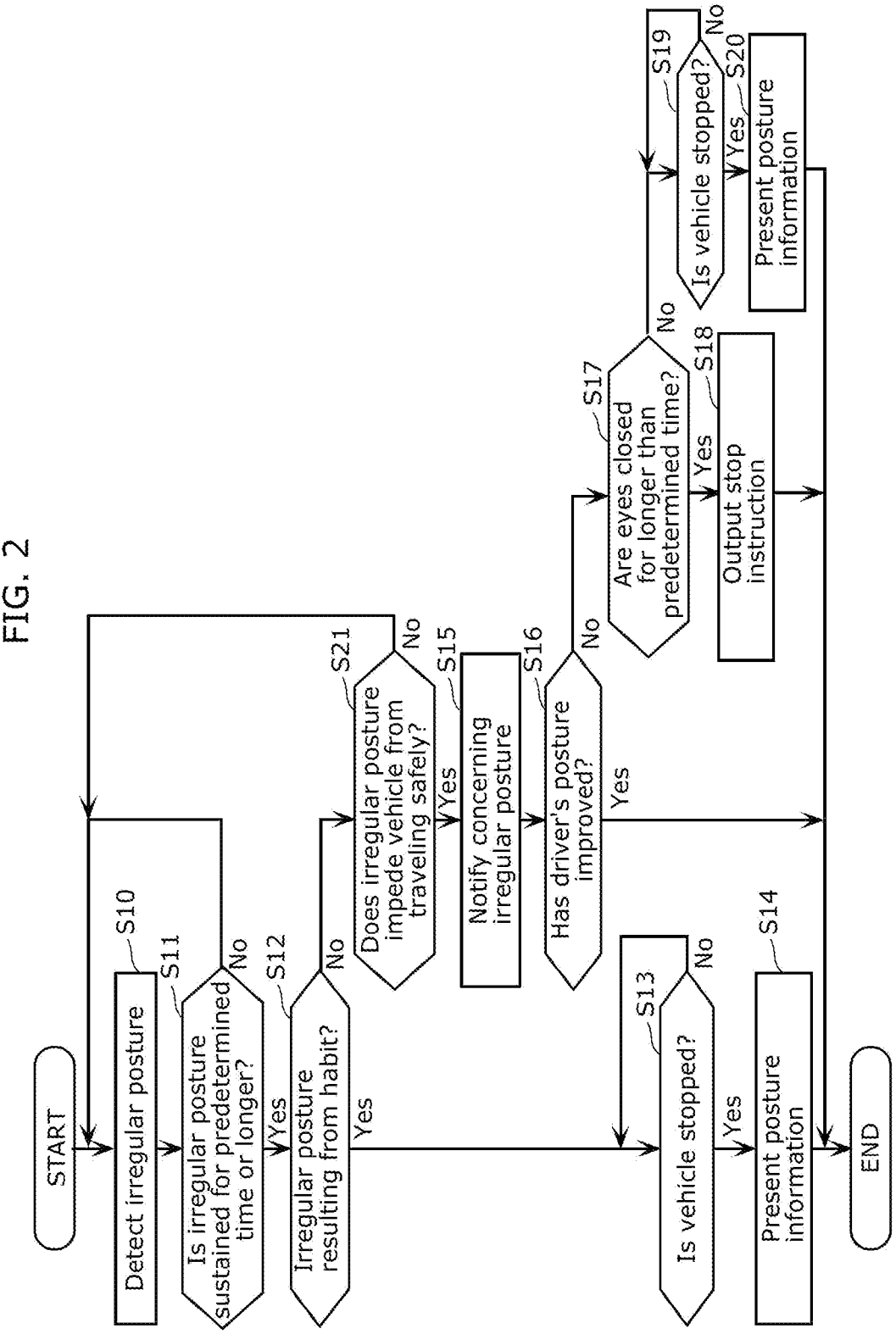
FIG. 2 is a flowchart illustrating an operation of a driver monitoring device according to an embodiment.

FIG. 2 is a flowchart illustrating an operation of driver monitoring device 10 according to the embodiment.

As illustrated in FIG. 2, detector 11 detects an irregular posture (S10). Detector 11 generates information indicating the detected irregular posture and outputs the generated information to determination controller 12. If detector 11 detects no irregular posture, the determination as to whether detector 11 detects an irregular posture may be repeated.

Next, determination controller 12 determines whether the detected irregular posture is sustained for a predetermined time or longer (S11).

If the irregular posture is sustained for the predetermined time or longer (YES in S11), determination controller 12 determines whether this irregular posture results from the driver's habit (S12). For example, if detector 11 continuously detects this irregular posture for the predetermined time or longer starting from immediately after the driver has started driving, determination controller 12 determines that this irregular posture results from the driver's habit (YES in S12). In this example, the point considered to be immediately after the driver has started driving falls within a predetermined period beginning from when the driver has moved the shift position from Park or within a predetermined period beginning from when the vehicle has started traveling. The shift position and the start of the vehicle's traveling are determined based on the vehicle information detected by vehicle sensor 31.

If it is determined that the detected irregular posture results from the driver's habit (YES in S12), determination controller 12 determines whether the vehicle is stopped (S13). Determination controller 12 determines the traveling speed of the vehicle based on the vehicle information acquired from vehicle sensor 31. For example, the vehicle is considered to be stopped when the vehicle is temporarily stopped with the brake engaged as well as when the vehicle is stopped with the engine turned off. Herein, determination controller 12 may determine that the vehicle is stopped not only when the vehicle is actually stopped but also when the vehicle is moving at a speed low enough to regard that the vehicle is substantially stopped.

If the vehicle is not stopped (NO in S13), determination controller 12 repeats the process in step S13.

If the vehicle is stopped (YES in S13), determination controller 12 presents the posture information indicating a proper driving posture and an influence of the irregular posture via display 27 and audio block 22 (S14).

Figure 3:
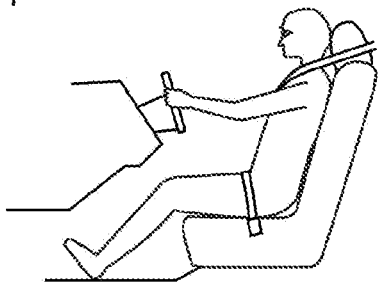
FIG. 3 is a schematic diagram illustrating some postures of a driver.
Figure 3:
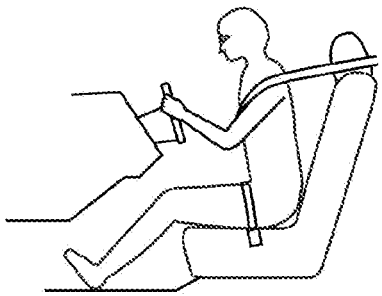
Figure 3:
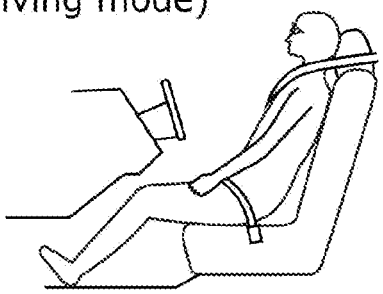

FIG. 3 is a schematic diagram illustrating some postures of a driver. The example in a in FIG. 3 presents a proper driving posture. The content presenting a proper driving posture shows an illustration of a correct driving posture, a procedure for correcting the driving posture, or the like. In the case of an irregular posture resulting from the driver's habit, this irregular posture does not immediately impede the vehicle from traveling safely. However, the driver may suffer from a physical burden caused by fatigue that accumulates as the driver continues to drive in the irregular posture, or the driver may become more susceptible to causing an accident due to such fatigue. Therefore, determination controller 12 presents information such as a correct driving posture while the vehicle is stopped and such presentation does not interfere with driving. For example, determination controller 12 displays a proper driving posture on display 27 or outputs a sound indicating an influence of the irregular posture via audio block 22.

Meanwhile, if the detected irregular posture is not detected starting from immediately after the driver has started driving, that is, if the irregular posture is detected continuously for the predetermined time or longer starting from some point following immediately after the driver has started driving, determination controller 12 determines that the detected irregular posture results from other than the driver's habit (NO in S12).

If determination controller 12 has determined that the detected irregular posture results from other than the driver's habit (NO in S12), determination controller 12 determines whether this irregular posture can impede the vehicle from traveling safely based on the vehicle information (S21). Examples of the irregular posture that does not impede the vehicle from traveling safely include an irregular posture that occurs when the driver leans forward to check right and left upon stopping the vehicle before entering a road from a store's parking lot or the like or before making a right or left turn at an intersection (b in FIG. 3), an irregular posture that occurs when the driver checks the rear view while backing up the vehicle (not illustrated), an irregular posture that occurs when the driver reclines the seat and lies down to take a nap upon stopping the vehicle (not illustrated), an irregular posture that occurs when the driver leans toward the passenger side to operate a smartphone or the like placed on the passenger seat upon pulling the vehicle over to the curb (not illustrated), and an irregular posture that occurs when the driver is in a relaxed state during automatic driving (not illustrated). If the detected irregular posture does not impede the vehicle from traveling safely (NO in S21), driver monitoring device 10 returns to the process in step S10 without providing any notification concerning the irregular posture (no attention calling) unless the detected irregular posture can immediately impede the vehicle from traveling safely.

If the detected irregular posture can impede the vehicle from traveling safely (YES in S21), driver monitoring device 10 provides a notification concerning the irregular posture (S15). In this case, driver monitoring device 10 alerts the driver with a method that has an immediate effect on the driver. For example, driver monitoring device 10 alerts the driver with a method that the driver can notice immediately. In addition, driver monitoring device 10 alerts the driver immediately at the moment when the detected irregular posture is determined to be an irregular posture resulting from other than the driver's habit. As the notification concerning the irregular posture, driver monitoring device 10 implements at least one or more of the following control techniques. Specifically, driver monitoring device 10 may cause audio block 22 to output a warning sound, cause audio block 22 to raise the volume of a warning sound gradually, cause illumination device 23 to change the light emitted from illumination device 23, cause first actuator 24 to tighten the seat belt provided in the driver's seat, cause second actuator 25 to make the steering wheel in the driver's seat vibrate, cause air conditioning device 26 to lower the temperature inside the vehicle compartment, cause air conditioning device 26 to blow the air toward the driver, or cause display 27 to display an alert concerning the irregular posture. With regard to the change in the light emitted from illumination device 23, driver monitoring device 10 may control illumination device 23 to increase the red tone of the light emitted from illumination device 23 or to increase the brightness of the light emitted from illumination device 23. Driver monitoring device 10 alerts the driver by controlling at least one of audio block 22, illumination device 23, first actuator 24, second actuator 25, air conditioning device 26, or display 27.

Determination controller 12 determines whether the posture of the driver has improved (S16). If the amount of irregularity in the posture is less than the threshold, determination controller 12 determines that the posture of the driver has improved (YES in S16) and terminates the flow. In this case, determination controller 12 causes audio block 22, illumination device 23, first actuator 24, second actuator 25, air conditioning device 26, and display 27 to stop providing any notification concerning an irregular posture.

If the amount of irregularity in the posture is greater than or equal to the threshold, determination controller 12 determines that the posture of the driver has not improved (NO in S16). Then, determination controller 12 determines whether the driver keeps his or her eyes closed for longer than a predetermined time (S17). For example, the driver is considered to be keeping his or her eyes closed not only when the driver keeps his or her eyes completely closed but also when the opening of the eyes is smaller than a predefined amount for longer than a predetermined time. Herein, the predetermined time in step S17 (e.g., a second predetermined time) may be the same as or different from the predetermined time in step S11 (e.g., a first predetermined time).

If the driver keeps his or her eyes closed for longer than the predetermined time (YES in S17), driver monitoring device 10 outputs a stop instruction to vehicle controlling device 32 so as to stop the vehicle safely through appropriate braking and steering (S18). This causes the vehicle to stop. In addition, in order to notify any nearby vehicle of a possible danger, driver monitoring device 10 outputs an instruction to vehicle controlling device 32 to turn on the headlights and sound the horn, for example. In response to this instruction, vehicle controlling device 32 turns on the headlights or sounds the horn. In other words, determination controller 12 of driver monitoring device 10 notifies any nearby vehicle of a possible danger. In addition, driver monitoring device 10 causes audio block 22 to output a warning in order to inform other passengers in the vehicle of a possible danger. In other words, determination controller 12 of driver monitoring device 10 notifies other passengers in the vehicle of a possible danger.

Meanwhile, if the driver does not keep his or her eyes closed for longer than the predetermined time (NO in S17), determination controller 12 determines whether the vehicle is stopped (S19) in a similar manner as in the process in step S13. If the vehicle is stopped (YES in S19), determination controller 12 presents the posture information (S20) in a similar manner as in the process in step S14. For example, c in FIG. 3 illustrates an example in which the driver drives the vehicle in the manual driving mode with his or her back being stretched. In this case, the driver is relaxed and is in an irregular posture. Therefore, determination controller 12 presents the posture information illustrated in a in FIG. 3 via display 27 and audio block 22.

Then, driver monitoring device 10 terminates the flow.

In the present embodiment, it is determined whether a detected irregular posture results from the driver's habit, and the driver is alerted in one flow in the case where the detected irregular posture results from the driver's habit and in another flow in the case where the detected irregular posture results from other than the driver's habit. Alternatively, without making any determination as to whether a detected irregular posture results from the driver's habit, the driver may be alerted of every detected irregular posture in the same flow as that for the irregular posture resulting from other than the driver's habit according to the present embodiment. In another alternative, without making any determination as to whether a detected irregular posture results from the driver's habit, the driver may be alerted of every detected irregular posture in the same flow as that for the irregular posture resulting from the driver's habit according to the present embodiment.

Advantageous Effects

Now, some advantageous effects of driver monitoring device 10 and the driver monitoring method according to the present embodiment will be described.

As described above, driver monitoring device 10 according to the present embodiment includes detector 11 and determination controller 12. Detector 11 detects an irregular posture of the driver in the driver's seat of a vehicle based on an image captured by image capturing device 21. Determination controller 12 determines whether the detected irregular posture can impede the vehicle from traveling safely based on the condition concerning traveling of the vehicle acquired from the vehicle and the irregular posture of the driver detected by detector 11. Determination controller 12 causes one or more notifiers provided in the vehicle to provide a notification concerning the irregular posture if determination controller 12 has determined that the detected irregular posture can impede the vehicle from traveling safely.

This configuration makes it possible to extract a case where no notification concerning an irregular posture needs to be provided by determining whether the detected irregular posture can impede the vehicle from traveling safely. If the detected irregular posture can impede the vehicle from traveling safely, the driver is provided with a notification concerning the irregular posture. This is likely to impel the driver to correct his or her posture and can thus ensure the safety of the driver driving the vehicle.

Accordingly, driver monitoring device 10 can keep any unnecessary notification from being provided. As a result, the driver is less likely to be troubled by the notification concerning an irregular posture.

In particular, driver monitoring device 10 can prompt the driver to correct the posture by outputting a notification concerning the irregular posture. Therefore, driver monitoring device 10 can ensure the safety of the driver driving the vehicle.

The driver monitoring method according to the present embodiment includes detecting an irregular posture of the driver in the driver's seat of a vehicle based on a captured image, determining whether the detected irregular posture can impede the vehicle from traveling safely based on the condition concerning traveling of the vehicle acquired from the vehicle and the detected irregular posture of the driver, and providing a notification concerning the irregular posture if the detected irregular posture is determined to be an irregular posture that can impede the vehicle from traveling safely.

This driver monitoring method can also provide advantageous effects similar to those described above.

In driver monitoring device 10 according to the present embodiment, determination controller 12 determines that the irregular posture detected by detector 11 is an irregular posture resulting from the driver's habit if the detected irregular posture is sustained for a predetermined time or longer starting from immediately after the driver has started driving the vehicle. Meanwhile, determination controller 12 determines that the irregular posture detected by detector 11 is an irregular posture resulting from other than the driver's habit if detector 11 detects the irregular posture continuously for a predetermined time or longer starting from some point following immediately after the driver has started driving the vehicle. Furthermore, determination controller 12 causes the one or more notifiers to provide a notification concerning an irregular posture in a different mode when the irregular posture is determined to be an irregular posture resulting from the driver's habit than when the irregular posture is determined to be an irregular posture resulting from other than the driver's habit.

This configuration makes it possible to determine whether the detected irregular posture is resulting from the driver's habit. This determination in turn makes it possible to determine whether the irregular posture of the driver is an irregular posture resulting from the driver's habit or an irregular posture resulting from other than the driver's habit, for example. Therefore, for example, information for correcting the habit can be provided to the driver if the irregular posture is resulting from the driver's habit, or the driver can be alerted if the irregular posture is resulting from other than the driver's habit. Furthermore, the above configuration makes it possible to extract a case where no notification concerning an irregular posture needs to be provided by determining whether the detected irregular posture can impede the vehicle from traveling safely. This makes it possible to keep the driver from being notified of the irregular posture if the detected irregular posture does not impede the vehicle from traveling.

In driver monitoring device 10 according to the present embodiment, determination controller 12 determines whether the detected irregular posture can impede the vehicle from traveling safely if the detected irregular posture results from other than the driver's habit. In addition, determination controller 12 causes the one or more notifiers to refrain from providing a notification concerning the irregular posture if the detected irregular posture does not impede the vehicle from traveling safely.

This configuration keeps the one or more notifiers from providing a notification concerning the irregular posture if the determination result of determination controller 12 indicates that the driver is not in an irregular posture that can impede the vehicle from traveling safely. Therefore, a notification concerning the irregular posture is not provided in a case where the detected irregular posture does not impede the vehicle from traveling. Examples of such a case include a case where the driver takes a nap upon stopping the vehicle, a case where the driver checks the rear view while backing up the vehicle, and a case where the driver operates a smartphone or the like upon pulling the vehicle over to the curb.

In driver monitoring device 10 according to the present embodiment, determination controller 12 determines that an irregular posture resulting from other than the driver's habit that occurs within a predetermined time preceding a point at which the vehicle makes a switch from an autonomous driving mode to a manual driving mode is an irregular posture that can impede the vehicle from traveling safely.

This configuration makes it possible to detect an irregular posture that can impede the vehicle from traveling safely.

In driver monitoring device 10 according to the present embodiment, detector 11 detects the amount of irregularity in the posture of the driver, and determination controller 12 varies the number of the one or more notifiers that provide a notification concerning the irregular posture in accordance with the magnitude of the amount of irregularity in the posture.

This configuration makes it possible to change the notification concerning the irregular posture in accordance with the condition of the driver since the amount of irregularity in the posture changes in accordance with the driving time.

In driver monitoring device 10 according to the present embodiment, determination controller 12 raises the number of the one or more notifiers that provide a notification concerning the irregular posture as the amount of irregularity in the posture is greater.

This configuration makes it possible to induce the driver's alertness powerfully when it seems to take a long time to induce the alertness in the driver, for example.

In driver monitoring device 10 according to the present embodiment, determination controller 12 determines whether the posture of the driver has improved based on the amount of irregularity in the posture and causes the one or more notifiers to stop providing the notification concerning the irregular posture if determination controller 12 has determined that the posture of the driver has improved.

This configuration makes it possible to keep the driver from feeling bothered by the notification after the driver has corrected his or her posture or from being distracted and failing to carefully check the vehicle's surroundings.

In driver monitoring device 10 according to the present embodiment, determination controller 12 determines whether the driver keeps his or her eyes closed for longer than a predetermined time if the amount of irregularity in the posture is greater than or equal to a threshold. In addition, determination controller 12 causes vehicle controlling device 23 that controlling driving of the vehicle to stop the vehicle if determination controller 12 has determined that the driver has kept his or her eyes closed for longer than the predetermined time.

This configuration makes it possible to reduce the chance of accident caused by the vehicle and to ensure the safety of the driver driving the vehicle.

In driver monitoring device 10 according to the present embodiment, determination controller 12 causes the one or more notifiers to provide a notification that informs a nearby vehicle of a possible danger when determination controller 12 causes vehicle controlling device 32 to stop the vehicle.

This configuration makes it possible to alert nearby vehicles, which may then impel the drivers of the nearby vehicles to avoid collision. Therefore, the above configuration makes it possible to ensure the safety of not only the host vehicle but also the nearby vehicles.

In driver monitoring device 10 according to the present embodiment, determination controller 12 causes the one or more notifiers to provide a notification that informs a passenger in the vehicle of a possible danger when determination controller 12 causes vehicle controlling device 32 to stop the vehicle.

This configuration makes it possible to notify other passengers of any problem with the driver and the driving condition of the vehicle when the vehicle is to be stopped. This may impel the other passengers to secure their safety.

In driver monitoring device 10 according to the present embodiment, at least one notifier of the one or more notifiers is first actuator 24 that tightens the seat belt provided in the driver's seat. The notification concerning the irregular posture is implemented by first actuator 24 tightening the seat belt provided in the driver's seat when the detected irregular posture is determined to be the irregular posture that can impede the vehicle from traveling safely.

This configuration allows the driver to realize that he or she has taken the eyes off the road upon having the seat belt tightened by first actuator 24 when the driver has taken the eyes off the road. This may impel the driver to bring his or her eyes back to the road. Therefore, driver monitoring device 10 can ensure the safety of the driver driving the vehicle.

Meanwhile, the seat belt is not tightened when the detected irregular posture does not impede the vehicle from traveling safely. This allows the driver to remain in the posture for checking the rear view when the driver checks the rear view while backing up the vehicle. Moreover, the driver can remain in a relaxed posture when the driver is in a relaxed posture during automatic driving.

In driver monitoring device 10 according to the present embodiment, at least one notifier of the one or more notifiers is audio block 22 disposed to the front of the driver's seat. The notification concerning the irregular posture is implemented by audio block 22 outputting a warning sound when the detected irregular posture is determined to be the irregular posture that can impede the vehicle from traveling safely.

With this configuration, when audio block 22 emits a warning sound from the front of the driver, the driver faces the traveling direction of the vehicle from which the sound has come. Therefore, driver monitoring device 10 allows the driver to realize that he or she has taken the eyes off the road. This may impel the driver to bring his or her eyes back to the road. Therefore, driver monitoring device 10 can ensure the safety of the driver driving the vehicle.

Meanwhile, no warning sound is output when the detected irregular posture does not impede the vehicle from traveling safely. This makes it possible to keep the driver from being distracted by the warning sound concerning the irregular posture and from failing to carefully check the vehicle's surroundings when the driver backs up the vehicle, for example.

In driver monitoring device 10 according to the present embodiment, audio block 22 gradually raises the volume of the warning sound if the detected irregular posture is determined to be the irregular posture that can impede the vehicle from traveling safely.

This configuration makes it possible to induce the alertness in the driver by raising the volume of the warning sound, for example. This leads the driver to correct his or her posture and drive carefully. Meanwhile, no warning sound is output when the detected irregular posture does not impede the vehicle from traveling safely. This configuration can keep the driver from being disturbed when the driver is taking a nap in a stopped vehicle, for example, In driver monitoring device 10 according to the present embodiment, at least one notifier of the one or more notifiers is illumination device 23 that illuminates the interior of the vehicle compartment. The notification concerning the irregular posture is implemented by changing the light emitted from illumination device 23 when the detected irregular posture is determined to be the irregular posture that can impede the vehicle from traveling safely.

This allows the driver to realize that he or she is in a bad posture by changing the light inside the vehicle compartment. Therefore, the level of alertness of the driver can be increased, and this leads the driver to correct his or her posture and drive carefully, for example.

Meanwhile, the light inside the vehicle compartment is not changed when the irregular posture does not impede the vehicle from traveling safely. This configuration can keep the driver from being disturbed when the driver is taking a nap in a stopped vehicle, for example, In driver monitoring device 10 according to the present embodiment, the notification concerning the irregular posture is implemented by increasing the red tone of the light emitted from illumination device 23 when the detected irregular posture is determined to be the irregular posture that can impede the vehicle from traveling safely.

This configuration causes the driver to feel a sense of crisis when the interior of the vehicle compartment is made red. This leads the driver to correct his or her posture and drive carefully.

In driver monitoring device 10 according to the present embodiment, the notification concerning the irregular posture is implemented by increasing the brightness of the light emitted from illumination device 23 when the detected irregular posture is determined to be the irregular posture that can impede the vehicle from traveling safely.

This configuration makes it possible to increase the level of alertness of the driver by increasing the brightness inside the vehicle compartment, for example. This leads the driver to correct his or her posture and drive carefully.

In driver monitoring device 10 according to the present embodiment, at least one notifier of the one or more notifiers is air conditioning device 26 that conditions the air inside the vehicle compartment. The notification concerning the irregular posture is implemented by at least one of causing air conditioning device 26 to lower the temperature inside the vehicle compartment or causing air conditioning device 26 to blow the air toward the driver when the detected irregular posture is determined to be the irregular posture that can impede the vehicle from traveling safely.

This configuration makes it possible to increase the level of alertness of the driver, for example, by lowering the temperature inside the vehicle compartment or by blowing the air toward the driver. This leads the driver to correct his or her posture and drive carefully.

In driver monitoring device 10 according to the present embodiment, at least one notifier of the one or more notifiers is second actuator 25 that causes the steering wheel in the driver's seat to vibrate. The notification concerning the irregular posture is implemented by second actuator 25 causing the steering wheel in the driver's seat to vibrate when the detected irregular posture is determined to be the irregular posture that can impede the vehicle from traveling safely.

This configuration allows the driver to realize that he or she has taken the eyes off the road as the steering wheel vibrates. Therefore, the level of alertness of the driver can be increased, for example. Moreover, the above configuration allows the driver to realize that he or she has taken the eyes off the road, for example. As a result, this leads the driver to correct his or her posture and drive carefully.

In driver monitoring device 10 according to the present embodiment, at least one notifier of the one or more notifiers is display 27 capable of presenting information to the driver. The notification concerning the irregular posture is implemented by displaying, on display 27, the content indicating that the detected irregular posture can impede the vehicle from traveling safely when the detected irregular posture is determined to be the irregular posture that can impede the vehicle from traveling safely.

This configuration makes it possible to alert the driver, for example, by displaying the content indicating that the driver is in an irregular posture on display 27. This leads the driver to correct his or her posture and drive carefully.

OTHER VARIATIONS, ETC

Thus far, the present disclosure has been described based on the embodiment, but the present disclosure is not limited to this embodiment and so on.

In the driver monitoring device and the driver monitoring method according to the foregoing embodiment, the driver does not need to be notified of the irregular posture, for example, when the driver is in a relaxed posture while the vehicle is traveling in an automatic driving mode or when the driver is leaning forward in the driver's seat to check the surroundings (the front, the back, the right, and the left) as in a case where the vehicle leaves a parking lot and enters a road or the vehicle makes a right turn or a left turn, since the irregular posture in these cases does not impede the vehicle from traveling safely. In this case, the determiner may determine whether there is anything impeding the vehicle from traveling safely with the use of a vehicle sensor or the like before making the determination on the irregular posture. If it is determined that there is nothing impeding the vehicle from traveling safely, the determiner does not need to determine whether the driver is in an irregular posture. Meanwhile, only if it is determined that there is something impeding the vehicle from traveling safely, the determiner may determine whether the driver is in an irregular posture.

In the driver monitoring device and the driver monitoring method according to the foregoing embodiment, the driver may be alerted of an irregular posture even in the automatic driving mode if the irregular posture appears within a predetermined time, during the automatic driving mode, in which the driving mode switches from the automatic driving mode to the manual driving mode. In other words, it is desirable that the driver be not in an irregular posture within a period immediately before the driving mode switches from the automatic driving mode to the manual driving mode in order for the driver to drive safely. The driver may be notified through the audio block, the display, and so on when the driving mode switches from the automatic driving mode to the manual driving mode so that the driver can appropriately start driving manually.

In the driver monitoring device and the driver monitoring method according to the foregoing embodiment, even if it is immediately after the driver has started driving the vehicle, the determiner may refrain from determining that the irregular posture detected continuously for a predetermined time or longer is an irregular posture resulting from the driver's habit if the detected irregular posture does not impede the vehicle from traveling safely, as in a case where the driver checks right and left upon stopping the vehicle to enter a road or where the driver backs up the vehicle to leave a parking lot, for example.

Thus, for example, in a case where an irregular posture can impede the vehicle from traveling safely as in a case of any irregular posture held when the vehicle is traveling straight ahead (forward) at a speed of 10 km per hour or higher during manual driving, the driver can be alerted of an irregular posture since, even if the driver enters an irregular posture similar to the one held when the driver checks right and left upon stopping the vehicle, this irregular posture is not determined to be the irregular posture resulting from the driver's habit.

In the driver monitoring device and the driver monitoring method according to the foregoing embodiment, the determination controller may include a determiner and a controller. The determiner determines an irregular posture of the driver that can impede the vehicle from traveling safely. The controller controls the audio block, the illumination device, the first actuator, the second actuator, the air conditioning device, and the display in accordance with the determination result of the determiner.

The driver monitoring device and the driver monitoring method according to the foregoing embodiment may be implemented by a program that uses a computer, and such a program may be stored in a storage device. In other words, the driver monitoring device may include a storage device.

Each processor included in the driver monitoring device and the driver monitoring method according to the foregoing embodiment may be implemented typically in the form of a large scale integration (LSI), which is an integrated circuit. The processors may each be implemented by a single chip, or part or all of the processors may be implemented by a single chip.

The circuit integration is not limited to the LSI, and an integrated circuit may be implemented by a dedicated circuit or a general purpose processor. A field programmable gate array (FPGA) that can be programmed after an LSI is manufactured or a reconfigurable processor in which the connection or the setting of the circuit cells within the LSI can be reconfigured may also be used.

In the foregoing embodiment, the constituent elements may each be implemented by dedicated hardware or may each be implemented through execution of a software program suitable for the corresponding constituent element. The constituent elements may each be implemented as a program executing unit, such as a central processing unit (CPU) or a processor, reads out a software program recorded in a recording medium, such as a hard disk or a semiconductor memory, and executes the software program.

All the numbers used in the foregoing are merely for illustrating specific examples to describe the present disclosure in concrete terms, and the embodiment of the present disclosure is not limited by the illustrated numbers.

The division of the functional blocks in the block diagram is merely an example. A plurality of functional blocks may be implemented as a single functional block, a single functional block may be divided into a plurality of functional blocks, or some of the functions may be transferred to another functional block. The functions of a plurality of functional blocks having similar functions may be processed in parallel or through time sharing by a single piece of hardware or software.

The order of executing the steps in the flowchart is for illustrating a specific example to describe the present disclosure in concrete terms, and the order may differ from the one described above. Some of the steps described above may be executed simultaneously (in parallel) with another step.

An embodiment obtained by making various modifications that a person skilled in the art can conceive of to the foregoing embodiment and an embodiment achieved by combining, as desired, the constituent elements and the functions in the embodiment within the scope that does not depart from the spirit of the present disclosure are also encompassed by the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by reference in their entirety: Japanese Patent Application No. 2019-237169 filed on Dec. 26, 2019 and Japanese Patent Application No. JP2020-158593 filed on Sep. 23, 2020.

INDUSTRIAL APPLICABILITY

The present disclosure can be applied to a system including an automatic driving vehicle and a manual driving vehicle.

The invention claimed is:

1. A driver monitoring device, comprising:
   a detector that detects an irregular posture of a driver in a driver's seat of a vehicle based on an image captured by an image capturing device; and
   a determiner that determines whether the irregular posture impedes the vehicle from traveling safely based on a condition of the vehicle acquired from the vehicle and the irregular posture of the driver detected by the detector, wherein
   the determiner causes one or more notifiers provided in the vehicle to provide a notification concerning the irregular posture in response to determining that the irregular posture impedes the vehicle from traveling safely.

2. The driver monitoring device according to claim 1, wherein
   the determiner
      determines that the irregular posture detected by the detector results from a habit when the irregular posture is sustained for a predetermined time or longer starting from immediately after the driver has started driving the vehicle, determines that the irregular posture detected by the detector results from other than the habit when the irregular posture is detected continuously for a predetermined time or longer starting from a point following immediately after the driver has started driving the vehicle, and causes the one or more notifiers to provide the notification concerning the irregular posture in a different mode when determining that the irregular posture results from the habit than when determining that the irregular posture results from other than the habit.

3. The driver monitoring device according to claim 2, wherein the determiner determines whether the irregular posture detected by the detector impedes the vehicle from traveling safely when the irregular posture results from other than the habit, and causes the one or more notifiers to refrain from providing the notification concerning the irregular posture in response to determining that the irregular posture does not impede the vehicle from traveling safely.

4. The driver monitoring device according to claim 1, wherein the determiner determines that an irregular posture resulting from other than a habit that occurs within a predetermined time preceding a point in time at which the vehicle makes a switch from an autonomous driving mode to a manual driving mode is an irregular posture that impedes the vehicle from traveling safely.

5. The driver monitoring device according to claim 1, wherein the detector detects an amount of irregularity in the irregular posture of the driver, and the determiner varies a total number of the one or more notifiers that provide the notification concerning the irregular posture in accordance with the amount of irregularity in the irregular posture.

6. The driver monitoring device according to claim 5, wherein the determiner raises the total number of the one or more notifiers that provide the notification concerning the irregular posture as the amount of irregularity in the irregular posture is greater.

7. The driver monitoring device according to claim 5, wherein the determiner determines whether a posture of the driver has improved based on the amount of irregularity in the irregular posture, and causes the one or more notifiers to stop providing the notification concerning the irregular posture in response to determining that the posture of the driver has improved.

8. The driver monitoring device according to claim 5, wherein the determiner determines whether eyes of the driver are kept closed for longer than a predetermined time when the amount of irregularity in the irregular posture is greater than or equal to a threshold, and causes a vehicle controlling device that controls driving of the vehicle to stop the vehicle in response to determining that the driver has kept the eyes closed for longer than the predetermined time.

9. The driver monitoring device according to claim 8, wherein the determiner causes the one or more notifiers to provide a notification that informs a nearby vehicle of a danger when causing the vehicle controlling device to stop the vehicle.

10. The driver monitoring device according to claim 8, wherein the determiner causes the one or more notifiers to provide a notification that informs another passenger in the vehicle of a danger when causing the vehicle controlling device to stop the vehicle.

11. The driver monitoring device according to claim 1, wherein at least one notifier of the one or more notifiers is a first actuator that tightens a seat belt provided in the driver's seat, and the notification concerning the irregular posture is implemented by the first actuator tightening the seat belt provided in the driver's seat when the determiner determines that the irregular posture impedes the vehicle from traveling safely.

12. The driver monitoring device according to claim 1, wherein at least one notifier of the one or more notifiers is an audio block disposed to a front of the driver's seat, and the notification concerning the irregular posture is implemented by the audio block outputting a warning sound when the determiner determines that the irregular posture impedes the vehicle from traveling safely.

13. The driver monitoring device according to claim 12, wherein the audio block gradually raises a volume of the warning sound.

14. The driver monitoring device according to claim 1, wherein at least one notifier of the one or more notifiers is an illumination device that illuminates an interior of a vehicle compartment, and the notification concerning the irregular posture is implemented by changing a light emitted from the illumination device when the determiner determines that the irregular posture impedes the vehicle from traveling safely.

15. The driver monitoring device according to claim 14, wherein the notification concerning the irregular posture is implemented by increasing a red tone of the light emitted from the illumination device when the determiner determines that the irregular posture impedes the vehicle from traveling safely.

16. The driver monitoring device according to claim 1, wherein at least one notifier of the one or more notifiers is an air conditioning device that conditions an air inside a vehicle compartment, and the notification concerning the irregular posture is implemented by at least one of causing the air conditioning device to lower a temperature inside the vehicle compartment or causing the air conditioning device to blow an air toward the driver when the determiner determines that the irregular posture impedes the vehicle from traveling safely.

17. The driver monitoring device according to claim 1, wherein
at least one notifier of the one or more notifiers is a second actuator that causes a steering wheel in the vehicle to vibrate, and
the notification concerning the irregular posture is implemented by the second actuator causing the steering wheel in the vehicle to vibrate when the determiner determines that the irregular posture impedes the vehicle from traveling safely.

18. The driver monitoring device according to claim 1, wherein
at least one notifier of the one or more notifiers is a display capable of presenting information to the driver, and
the notification concerning the irregular posture is implemented by displaying a content indicating that the irregular posture impedes the vehicle from traveling safely when the determiner determines that the irregular posture impedes the vehicle from traveling safely.

19. A driver monitoring method, comprising:
detecting an irregular posture of a driver in a driver's seat of a vehicle based on a captured image;
determining whether the irregular posture impedes the vehicle from traveling safely based on a condition of the vehicle acquired from the vehicle and the irregular posture detected of the driver; and
providing a notification concerning the irregular posture when the determining determines that the irregular posture impedes the vehicle from traveling safely.

20. A driver monitoring device, comprising:
a processor; and
a memory including a program that, when executed by the processor, causes the processor to perform operations, the operations including:
detecting an irregular posture of a driver in a driver's seat of a vehicle based on an image captured by a camera;
determining whether the irregular posture impedes the vehicle from traveling safely based on a condition of the vehicle acquired from the vehicle and the irregular posture of the driver detected by the processor; and
providing a notification concerning the irregular posture in response to determining that the irregular posture impedes the vehicle from traveling safely.

* * * * *